United States Patent
Shanks et al.

(10) Patent No.: US 8,155,721 B2
(45) Date of Patent: *Apr. 10, 2012

(54) METHOD AND DEVICE FOR REDUCING UNDESIRABLE ELECTROMAGNETIC RADIATION

(75) Inventors: Steven C Shanks, McKinney, TX (US); Kevin B Tucek, McKinney, TX (US); George Leger, Mesa, AZ (US)

(73) Assignee: Erchonia Corporation, McKinney, TX (US)

( * ) Notice: Subject to any disclaimer, the term of this patent is extended or adjusted under 35 U.S.C. 154(b) by 394 days.

This patent is subject to a terminal disclaimer.

(21) Appl. No.: 12/455,731

(22) Filed: Jun. 4, 2009

(65) Prior Publication Data

US 2009/0253397 A1 Oct. 8, 2009

Related U.S. Application Data

(63) Continuation-in-part of application No. 10/756,659, filed on Jan. 12, 2004, now abandoned, and a continuation-in-part of application No. 11/487,045, filed on Jul. 14, 2006, now abandoned, and a continuation-in-part of application No. 12/215,231, filed on Jun. 26, 2008, now Pat. No. 7,800,554.

(51) Int. Cl.
*H04M 1/00* (2006.01)

(52) U.S. Cl. ............... 455/575.5; 455/575.1; 455/575.6; 343/702; 343/841

(58) Field of Classification Search ............... 455/550.1, 455/575.5, 575.6; 343/702, 841, 895
See application file for complete search history.

(56) References Cited

U.S. PATENT DOCUMENTS

| | | |
|---|---|---|
| 276,468 A | 9/1956 | Paust |
| 368,988 A | 9/1972 | Kaplan et al. |
| 484,976 A | 7/1989 | Marko |

(Continued)

FOREIGN PATENT DOCUMENTS

EP 1469550 A2 4/2004

(Continued)

OTHER PUBLICATIONS

European Patent Office, Extended Search Report, Apr. 1, 2010, Munich, Germany.

(Continued)

*Primary Examiner* — Tuan H Nguyen
(74) *Attorney, Agent, or Firm* — Etherton Law Group, LLC; Benjamin D. Tietgen; Sandra L. Etherton (57) ABSTRACT

The present invention is a method and device for reducing exposure to undesirable electromagnetic radiation. The dissipation device uses a varying angle antenna design to capture radiation from an active emission source, such as a cellular telephone when it is transmitting. The device converts the captured radiation into an electric current and dissipates the collected current by spending it to operate a thermal, mechanical, or electrical device. The varying angle antenna is a printed circuit board trace antenna comprising a microstrip having several serially connected meandering segments. One or more meandering segments include 90-degree bends in the microstrip, and one or more meandering segments include bends of more and less than 90 degrees. Portions of the microstrip that are horizontally oriented are all parallel, while portions of the microstrip that are vertically oriented can be parallel or angled, depending on the bend angle. Additionally, near the center of the varying angel antenna, the microstrip segments are narrower than the microstrip segments near the ends of the antenna. In general, the meandering segments include varying angles, which maximizes the operation of the antenna for absorbing undesirable electromagnetic radiation from cellular telephones.

8 Claims, 5 Drawing Sheets

U.S. PATENT DOCUMENTS

| | | | |
|---|---|---|---|
| 561,322 | A | 3/1997 | Hunt |
| 581,713 | A | 10/1998 | Suzuki |
| 582,620 | A | 10/1998 | Gratias |
| 587,763 | A | 3/1999 | Kraz |
| 596,968 | A | 10/1999 | Ireland |
| 598,648 | A | 11/1999 | Yu et al. |
| 603,149 | A | 2/2000 | Simmons et al. |
| 618,478 | A1 | 2/2001 | Richley et al. |
| 6,314,277 | B1 | 11/2001 | Hsu et al. |
| 6,356,773 | B1 | 3/2002 | Rinot |
| 641,968 | A1 | 7/2002 | Zubova |
| 6,459,415 | B1 | 10/2002 | Pachal |
| 648,468 | A1 | 11/2002 | Kuroda |
| 6,624,536 | B1 | 9/2003 | Sawada et al. |
| 6,920,340 | B2 | 7/2005 | Laderman |
| 6,957,051 | B1 | 10/2005 | Korisch et al. |
| 7,138,948 | B2 | 11/2006 | Yeh |
| 731,556 | A1 | 1/2008 | McCorkle |
| 7,358,925 | B2 * | 4/2008 | Rosenberg et al. ........... 343/900 |
| 2002/0030626 | A1 | 3/2002 | Nagumo et al. |
| 2002/0075189 | A1 * | 6/2002 | Carillo et al. ................. 343/702 |
| 2003/0006384 | A1 | 1/2003 | Masaki et al. |
| 2004/0032376 | A1 | 2/2004 | Ikramov et al. |
| 2004/0176805 | A1 | 9/2004 | Whelan et al. |
| 2004/0245473 | A1 | 12/2004 | Takayama et al. |
| 2005/0090299 | A1 | 4/2005 | Tsao et al. |
| 2005/0148828 | A1 | 7/2005 | Lindsay |
| 2006/0097930 | A1 | 5/2006 | Rosenberg et al. |
| 2006/0132364 | A1 | 6/2006 | Qi et al. |
| 2006/0256018 | A1 | 11/2006 | Soler Castany et al. |
| 2007/0152901 | A1 | 7/2007 | Hockey et al. |
| 2008/0048929 | A1 | 2/2008 | Channabasappa |
| 2008/0068175 | A1 | 3/2008 | Hockey et al. |

FOREIGN PATENT DOCUMENTS

| | | |
|---|---|---|
| EP | 1523061 A1 | 4/2005 |
| JP | 3044424 U | 12/1997 |
| JP | 200049487 A | 2/2000 |
| JP | 2001-298313 A1 | 10/2001 |
| JP | 2002-368528 A | 12/2002 |
| JP | 2003008278 A | 1/2003 |
| WO | WO 89/05673 | 6/1989 |

OTHER PUBLICATIONS

Korean Intellectual Property Office, PCT Written Opinion of the International Searching Authority and International Search Report, Apr. 13, 2007, Republic of Korea.

International Bureau of WIPO, PCT International Preliminary Report on Patentability, Jan. 14, 2009, Geneva, Switzerland.

Computer translation of Japanese Patent Publication JP 2002-368528.

International Search Report and Written Opinion of the International Searching Authority for PCT/US2009/003817 filed Jun. 26, 2009, Korean Intellectual Property Office, Dec. 30, 2009.

http://www.buryl.com Power Pulsar Publication.

Wave Guard Advertisement.

* cited by examiner

METHOD AND DEVICE FOR REDUCING UNDESIRABLE ELECTROMAGNETIC RADIATION

CROSS-REFERENCE TO RELATED APPLICATIONS

This application is a continuation-in-part of co-pending U.S. application Ser. No. 10/756,659 filed Jan. 12, 2004. This application is also a continuation-in-part of co-pending U.S. application Ser. No. 11/487,045 filed Jul. 14, 2006, and co-pending U.S. application Ser. No. 12/215,231 filed Jun. 26, 2008.

FIELD OF INVENTION

This invention relates generally to magnetic filed devices that receive electromagnetic radiation. This invention relates more specifically to a magnetic field devices with varying angle antennas adapted to be placed in the vicinity of an active electromagnetic radiation emission source to reduce undesirable radiation that emanates from the active emission source.

BACKGROUND

Many devices transmit electromagnetic radiation when in operation. For example, wireless communication devices intentionally emanate electromagnetic radiation when transmitting. Other devices transmit inadvertently, for example when a microwave oven is cooking, microwaves may inadvertently escape the oven. The widespread acceptance and use of hand-held, portable cellular telephones has been accompanied by increasing concern regarding possible harmful effects of such radiation. New hand-held cellular telephones typically have an elongated housing with an internal antenna, and older hand-held cellular telephones typically have an elongated housing with an antenna extending upward vertically from the housing. When using either type of telephone, the user's head comes into close proximity to the antenna when his head is placed adjacent to the cellular telephone. The antenna emanates radiation when the cellular telephone is transmitting, and such an antenna is referred to herein as a transmitting antenna. Thus, when the user is talking, the device is emanating radiation from the transmitting antenna, and a substantial amount of electromagnetic energy is projected directly onto the user's head at close range.

Each cellular telephone has to meet certain government guidelines as to the amount of radiation to which the user is exposed. The amount of RF radiation absorbed by the body is measured in units known as SARs, or specific absorption rates. It would be desirable to reduce the SARs without significantly adversely affecting the operation of the telephone.

There have been attempts to shield the body from the electromagnetic energy emanating from the transmitting antenna. For example, U.S. Pat. No. 5,613,221 issued to Hunt discloses a conductive strip placed between the transmitting antenna and the user's head, to conduct radiation away from the user's head. There have also been some attempts to move the source of electromagnetic energy away from the body by changing the transmitting antenna location or radiation pattern. For example, U.S. Pat. No. 6,356,773 issued to Rinot removes the transmitting antenna from the phone and places it atop the user's head. An insulating shield is disposed between the transmitting antenna and the user's head, like a cap, for blocking emissions so that they do not penetrate through to the user. U.S. Pat. No. 6,031,495 issued to Simmons et alia uses a conducting strip between two poles of a transmitting antenna to create an end fire bidirectional pattern away from the user's head. Others have tried to reduce exposure to harmful emission by canceling the radiation. For example, U.S. Pat. No. 6,314,277 issued to Hsu et alia, is a cellular telephone antenna that cancels transmitted radiation of the cellular telephone with an absorbent directional shield by feeding the signal back into the cellular telephone.

Therefore, it is an object of this invention to provide a method and device with an antenna design that decreases the SARs to the user of an active emission source without significantly adversely affecting the desired performance of the emission source. It is a particular object to provide an antenna design specifically tuned for reducing the undesirable radiation a user is exposed to from a cellular telephone. It is a further object to provide an antenna design that can capture electromagnetic radiation from a cellular telephone operating in any of the four predominant frequency bands allotted for cellular telephone communication. It is yet a further object to provide a method and device for reducing undesirable radiation from an existing emission source that does not require connecting to or redesigning the emission source.

SUMMARY OF THE INVENTION

The present invention is a method and device for reducing exposure to undesirable electromagnetic radiation that is powered by ambient electromagnetic radiation. The dissipation device uses a varying angle antenna to capture radiation from an active emission source, such as a cellular telephone when it is transmitting. The device converts the captured radiation into an electric current and dissipates the collected current by spending it to operate a current-using device, which may be a thermal, mechanical, chemical or electrical device, or combination thereof. In the preferred embodiment, the current is directed to an LED display that lights up when supplied with sufficient current, thereby spending the collected current, and serving a secondary purpose of showing the user that the device is working. In another embodiment, the current is directed to a pulse generator to generate radio and light pulses that offset harmful effects of electromagnetic radiation. The varying angle antenna is a PCB trace antenna comprising a microstrip having several serially connected meandering segments. One or more meandering segments include 90-degree bends in the microstrip, and one or more meandering segments include bends of more and less than 90 degrees. Horizontal portions of the microstrip are all parallel, while vertical portions of the microstrip can be parallel or angled, depending on the bend angle. Additionally, near the center of the varying angel antenna, the microstrip segments are narrower than the microstrip segments near the ends of the antenna. In general, the meandering segments include varying angles, which maximizes the operation of the antenna for absorbing undesirable electromagnetic radiation from cellular telephones.

DETAILED DESCRIPTION OF THE INVENTION

Figure 1:
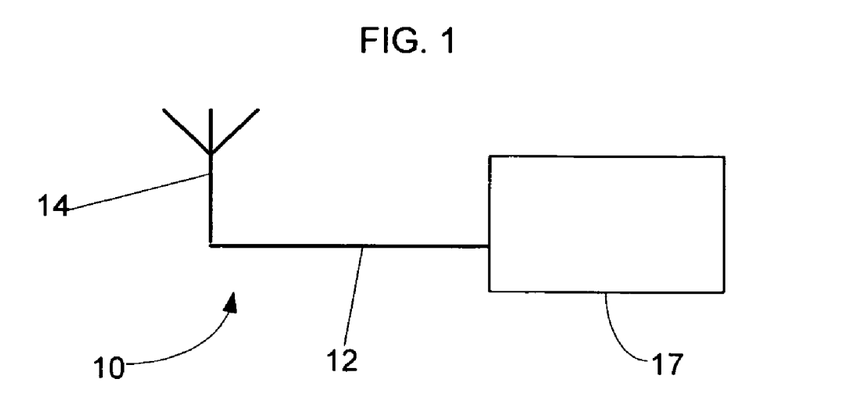
FIG. 1 is a block diagram illustrating the electromagnetic radiation dissipation device of the present invention.
Figure 2:
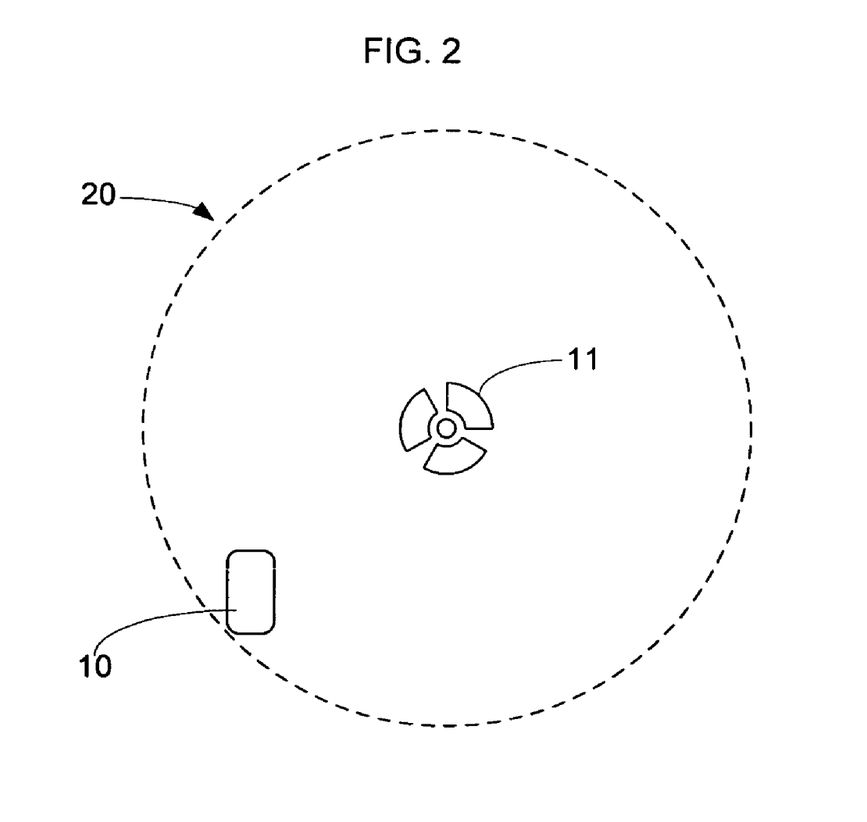
FIG. 2 is block diagram illustrating the electromagnetic radiation dissipation device of the present invention positioned near an emission source.

The present invention, referred to generally as dissipation device 10, reduces undesirable radiation. Dissipation device 10 comprises a target antenna 14 and a dissipation assembly 17, as illustrated in FIG. 1. When an emission source 11, as shown in FIG. 2, is in operation it transmits electromagnetic radiation. When target antenna 14 is bombarded by the radiation, electrons are stirred up in the antenna 14, generating an electron flow (current). To continue to absorb the electromagnetic radiation, the current eventually must be drained from the target antenna. This current is drained from the target antenna 14 with a conductor 12 and moved to a dissipation assembly 17, which spends the current by operating an electrical, mechanical or thermal device. For small emission sources, the current is small and the conductor may be as simple as a wire or printed circuit board lead. For larger emission sources, a heavier-duty conductor may be required.

Figure 3:
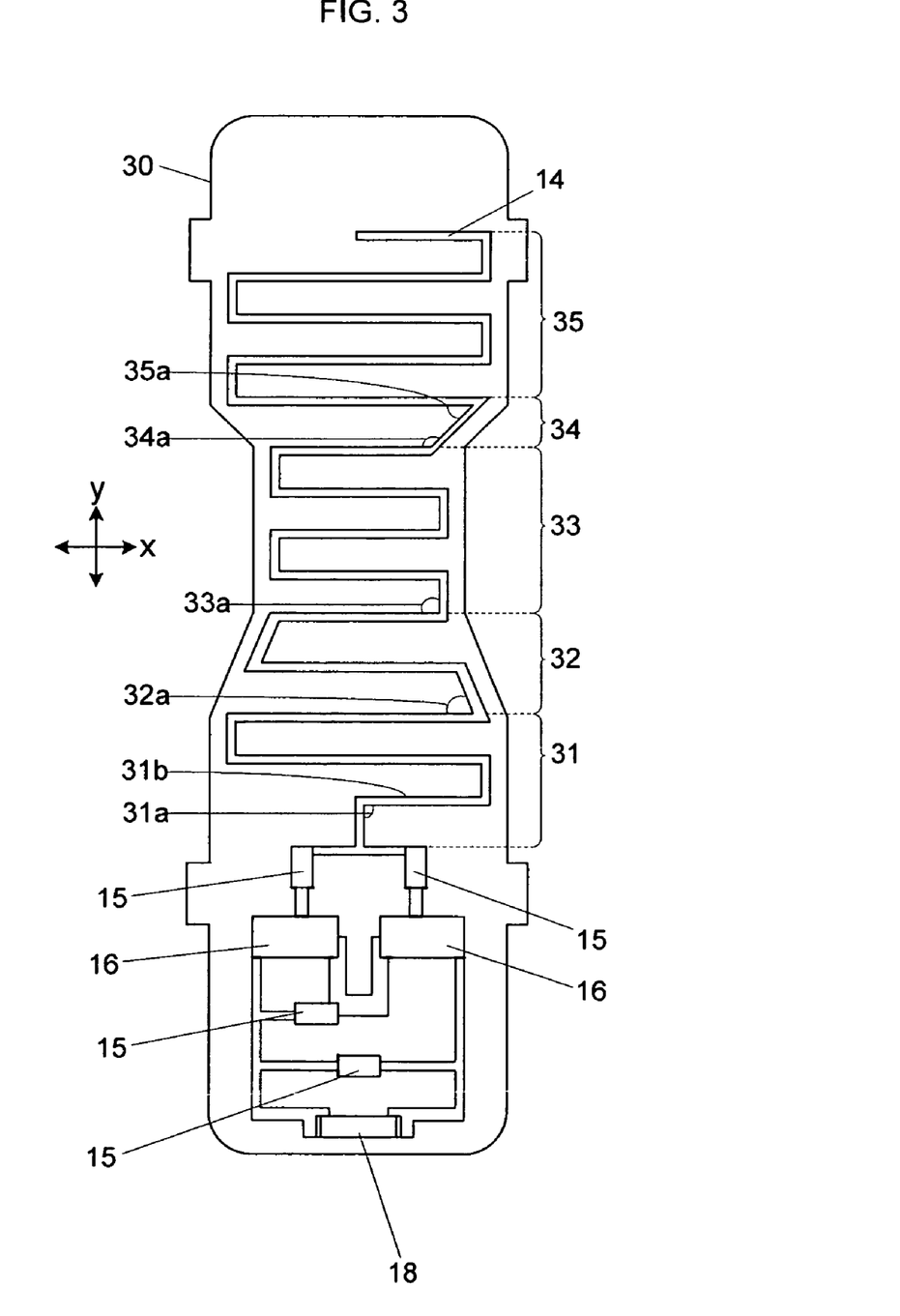
FIG. 3 is a block diagram of a printed circuit board incorporating the antenna of the present invention for use with a cellular telephone.

FIG. 3 illustrates a PCB 30 incorporating a target antenna 14 of the present invention. As is known in the art, an antenna is any conducting mass that functions as a receiver or collector of electromagnetic energy. Additionally, antennas have a number of important parameters; those of most interest include the gain, radiation pattern, bandwidth and polarization. In a receiving antenna, the applied electromagnetic field is distributed throughout the entire length of the antenna to receive the undesirable radiation. If the receiving antenna that the signal strikes has a certain length relative to the wavelength of the received radiation, the induced current will be much stronger. The desired length of the antenna can be determined by using the well-known equation:

$$(\lambda)(f)=c$$

where $\lambda$ is the wavelength of the incident radiation, f is the frequency of the incident radiation, and c is the speed of light. For example, if a signal at 1900 MHz travels through the air, it completes a cycle in approximately 32 cm. If the signal strikes a 32 cm antenna or certain fractions of it (½ or ¼ or 1/16 wavelength), then the induced current will be much higher than if the signal struck a target antenna that was not some appreciable fraction of the wavelength.

Typically, cellular phones and other wireless communications technologies such as PCS, G3 or Bluetooth® emit radiation in the radio or microwave ranges, or both, when transmitting. These and other consumer products often emit multiple wavelengths (frequencies). Cellular telephones, in particular, emit radiation in the 450 MHz, 850 MHz, 900 MHz, 1800 MHz, and 1900 MHz ranges when transmitting. This means that the target antenna 14 must perform well over a range of frequencies. The corresponding wavelengths for cellular telephone frequencies are summarized below:

| f | $\lambda$ | ½ $\lambda$ | ¼ $\lambda$ | 1/16 $\lambda$ |
|---|---|---|---|---|
| 450 MHz | 64 cm | 32 cm | 16 cm | 4 cm |
| 850 MHz | 33.88 cm | 16.9 cm | 8.47 cm | 2.12 cm |
| 900 MHz | 32 cm | 16 cm | 8 cm | 2 cm |
| 1800 MHz | 16 cm | 8 cm | 4 cm | 1 cm |
| 1900 MHz | 15.16 cm | 7.58 cm | 3.79 cm | 0.95 cm |

The target antenna 14 herein is a varying angle receiving antenna and does not intentionally transmit electromagnetic energy. Target antenna 14 is preferably a monopole PCB trace antenna comprised of a 1 oz copper microstrip arranged in a serpentine or meandering pattern. PCB trace antennas, microstrips, and methods for making them are well known in the art. PCB 30 has a top surface that includes the microstrip. In the preferred embodiment, the PCB is a standard 0.8 mm FR4 substrate material that is nonconducting at 1.8 GHz. For increased flexibility, a 0.5 mm substrate may be substituted. For example, to allow the PCB antenna to mount to an irregular or rounded cellular telephone or other device, a PCB thickness of 0.5 mm or less is desirable. In the preferred embodiment, the PCB is a bottle shape as shown in FIG. 3, and rather than using a ground plane for the antenna, the antenna is connected to a bridge rectifier to turn alternating current into direct current for lighting an LED.

Figure 4:
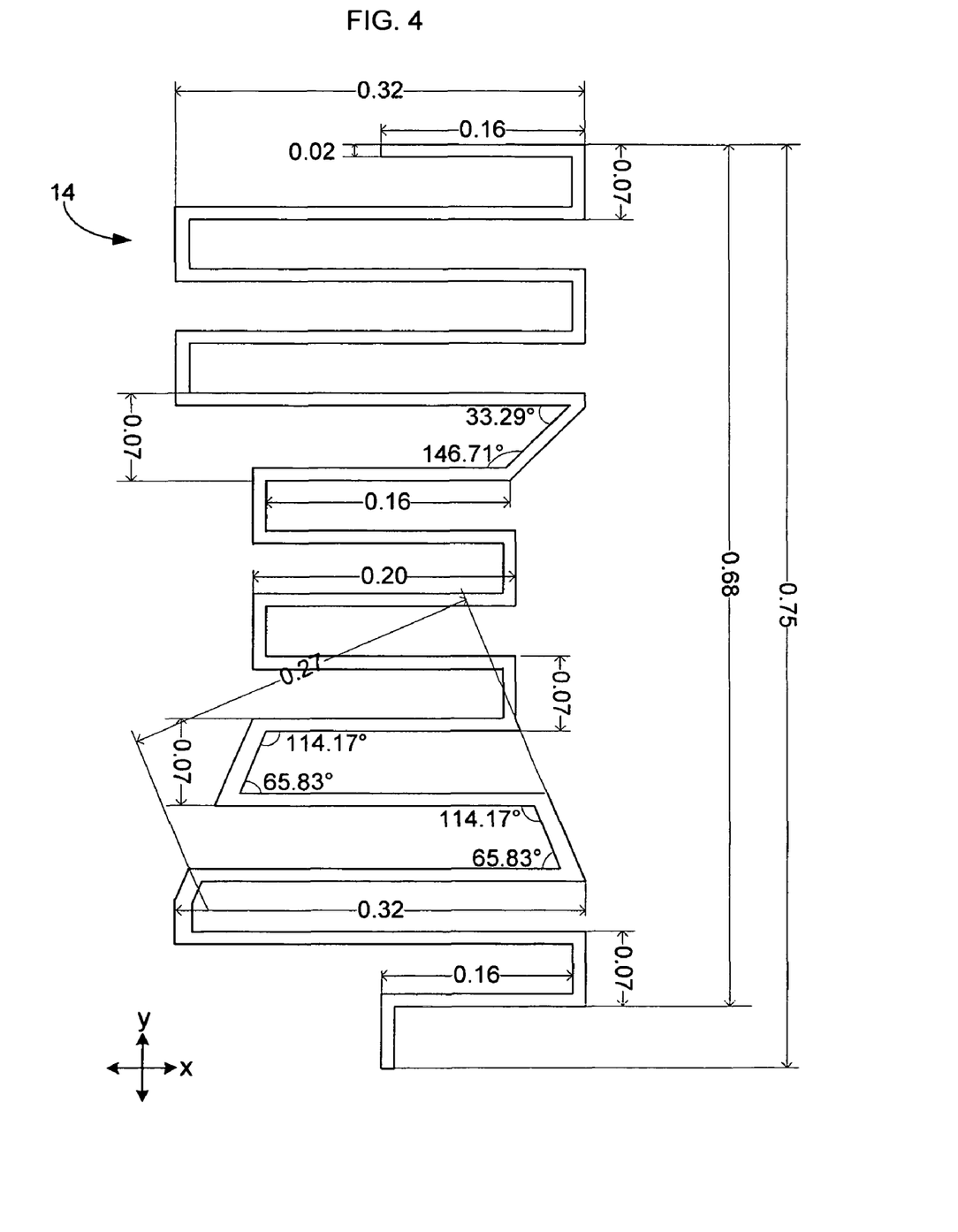
FIG. 4 depicts the preferred dimensions of the antenna.

The microstrip on the top surface of the PCB 30 is preferably 0.020 inches wide, and the overall length of the microstrip is 3.86165 inches. The preferred overall antenna area of copper is 0.0798 inches squared, and the preferred circumference of the antenna is 7.9349 inches. The pattern, as shown in FIG. 3, incorporates several 90-degree turns or bends in addition to several turns or bends of greater or lesser degree. The specific dimensions of the segments and angles of the preferred embodiment are shown in FIG. 4. All of the measurements are in inches in FIG. 4, and the tolerances are ±0.5° for angular measurements and ±0.015 for linear measurements. For the sake of convenience and with respect to FIGS. 3 and 4, the portions of varying angle antenna 14 that extend in the y direction will be considered vertical portions (or vertically-oriented portions), and the portions of varying angle antenna that extend in the x direction will be referred to herein as horizontal portions (or horizontally-oriented portions). As is shown in FIGS. 3 and 4, all of the horizontal portions of varying angle antenna 14 are parallel to one another. The vertical portions, however, can be parallel or angled. The vertical portions are consistent in height (or y displacement) for each meander portion. As shown in FIG. 4, they are uniform and 0.07 inches throughout (not all of the heights are shown but should be considered consistent throughout). The horizontal portions and vertical portions are connected to one another at an angle or "bend angle." Bend angles can be any interior angle between 0 degrees and 180 degrees.

FIG. 3 illustrates that target antenna 14 can be broken into several serially connected microstrip segments 31-35. First microstrip segment 31 includes a vertical portion that is coupled at its proximal end to capacitors 15. Segment 31 then bends 90 degrees at bend 31a to a horizontal portion 31b that is half the overall width of segment 31. Segment 31 then meanders back and forth and includes another four 90-degree bends. In segment 31, the vertical portions are parallel to one another. The distal end of segment 31 is coupled to the proximal end of second microstrip segment 32 bend 32a that is less than 90 degrees. Segment 32 tapers from the overall width of segment 31 to a smaller width and includes a meander pattern involving bends greater and less than 90 degrees, such that each vertical portion is angled toward the centerline along the y axis of the antenna. The distal end of segment 32 is coupled to the proximal end of third microstrip segment 33 at bend 33a. Segment 33 is narrower than segment 31 but includes seven more 90-degree bends. In segment 33, the vertical portions are parallel to one another. The distal end of segment 33 is coupled to the proximal end of fourth microstrip segment 34 at bend 34a. Segment 34 tapers from the width of segment 33 to a larger width and includes bends greater and less than 90 degrees, such that the vertical portion is angled away from the center. Finally, the distal end of segment 34 is coupled to the proximal end of fifth microstrip segment 35 at bend 35*a*. Segment 35 is the same overall width as segment 31 and includes eight 90-degree bends. The final portion of segment 35 is horizontal and is one half the length of the other horizontal portions of segment 35. The vertical portions of section 35 are parallel to one another. For the preferred embodiment, there are 21 angles of 90 degrees, 3 angles of less than 90 degrees, and 3 angles of more than 90 degrees. Alternative embodiments can have varying numbers of angles, however the general bottle shape shown in FIGS. 3 and 4 incorporating bends of various angles gives the broadest range of reception.

Target antenna 14 cooperates with dissipation assembly 17 of dissipation device 10 to effectively decreasing the SARs to the user of a cellular telephone without significantly adversely affecting the transmission from the cellular telephone to the cell tower, or base station. As shown in FIG. 3, target antenna 14 is connected to capacitors 15 and diodes 16, to drive the LED 18. This further permits the dissipation device to also indicate to its user that electromagnetic radiation is present. The capacitors and diodes act as a voltage multiplier to generate sufficient voltage to drive the LED 18. For example, in this low-level application, four capacitors 15 are used with two diodes 16. Preferably the diodes 16 are high-frequency RF Schottky diodes, which have a very low forward voltage of about 0.2-0.3 V. Such diodes are available commercially from, for example, Aeroflex/Metelics, Inc. of Sunnyvale, Calif. Preferably the capacitors are 1.0 uf, 6 VDC ceramic capacitors such as the AVX 0603ZD105KAT2A available from AVX of Myrtle Beach, S.C. Additionally, the LED is preferably a low current 632 nm red LED such as the APT1608SEWE available from Kingbright Corp. of City of Industry, Calif.

The number of capacitors and diodes can be increased or decreased as necessary when cooperating with emission sources of different levels of radiation. For example, when reducing undesirable emission from an emission sources emanating higher energy, such as short-wave radio, the number of capacitors can be reduced because the voltage draining off the antenna is itself sufficient to drive a dissipater assembly.

The collected current can be used to operate any dissipation assembly 17, which is defined as one or more users of current. For example, the dissipation assembly 17 can be one or more of a buzzer, bell or any other transducer that converts electrical energy to sound; motor or any other transducer that converts electrical energy to motion; heater or any other transducer that converts electrical energy to heat; lamp or any transducer that converts electrical energy to light; or a combination thereof. The current may be used to catalyze a chemical reaction. In the preferred embodiment, the current is directed to an LED that lights up when supplied with the current, serving a secondary purpose of showing the user when the device 10 is working or when electromagnetic radiation is present. In another embodiment, the current is directed to an LCD display. The dissipation assembly 17 may be used to operate one or more users of current within the emission source 11.

Figure 5:
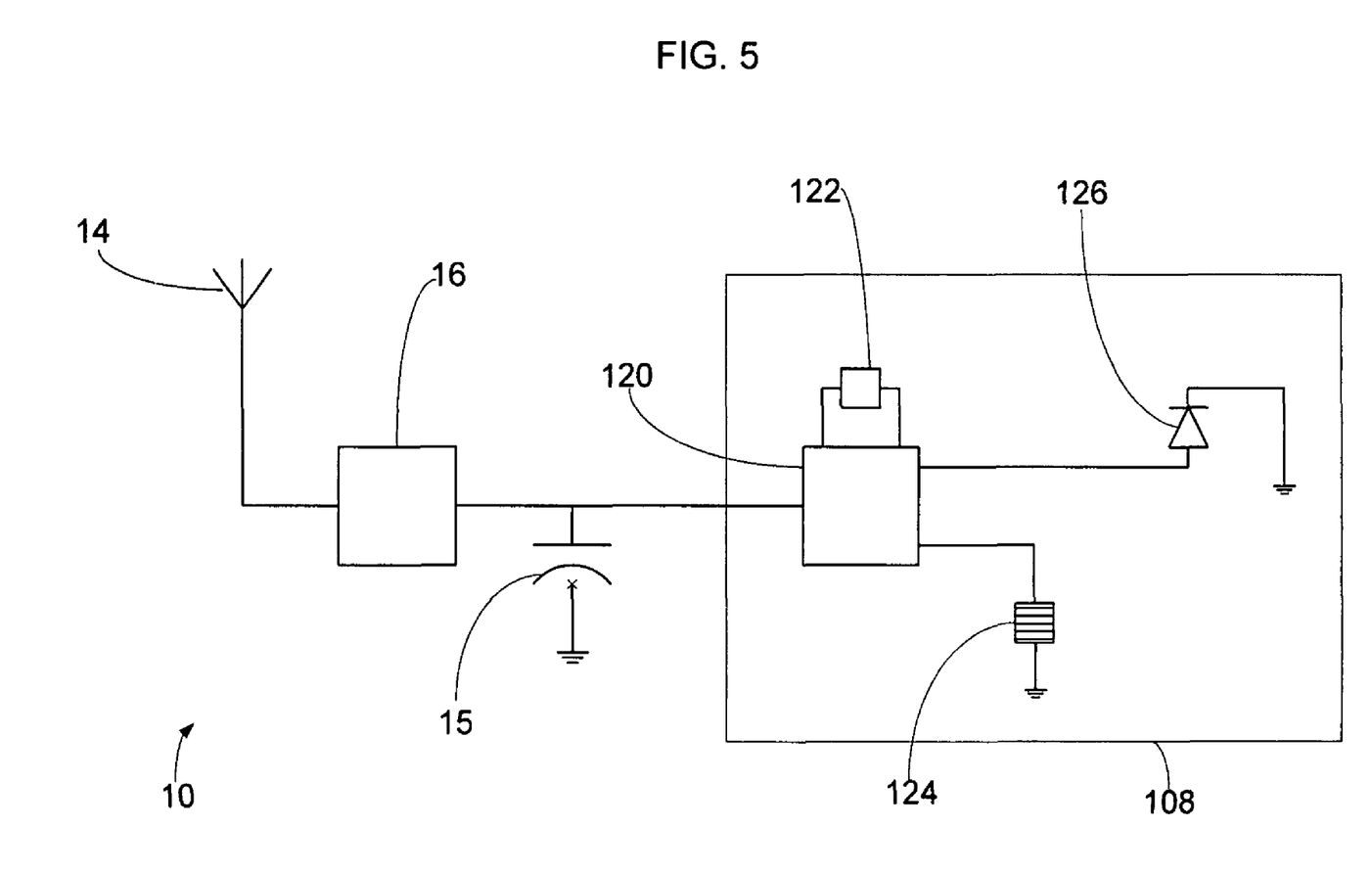
FIG. 5 is a block diagram illustrating an alternative embodiment of the electromagnetic radiation device.

The collected current can also be used to operate pulse a generator 108 for generating counteracting electromagnetic radiation in pulses. As shown in FIG. 5, target antenna 14 is connected to one or more diodes 16 and one or more capacitors 15 to drive pulse generator 108. Pulse generator 108 preferably comprises processor 120, oscillator 122, inductor 124, and light emitting diode 126. Pulse generator 108 provides at least one frequency up to about 69 Hz, and the radiation is typically generated in a sphere. The energy can be directed to a more limited scope, such as encompassing only the portion of a cellular telephone user's head exposed to the cellular telephone's radiation. Processor 120 is preferably a microprocessor, such as a Microchip Company PIC-629 processor, preferably operating in the lowest power mode. Oscillator 122 is preferably a 32.768 kilohertz crystal. Inductor 124 is preferably a 10 millihenry coil used to produce a magnetic field at the Schuman frequency, which is the frequency of the geomagnetic field of the earth. Light emitting diode 126 preferably emits red light having a 635 nanometer wavelength pulsing at the Schuman frequency. Light emitting diode also 126 also provides an indication that device 10 is working. Under appropriate circumstances other pulse generators 108 such as inductor-capacitor, rubidium, oven-controlled, voltage-controlled, clock, temperature compensated, pulse generators producing other frequencies, etc., may suffice.

Figure 6:
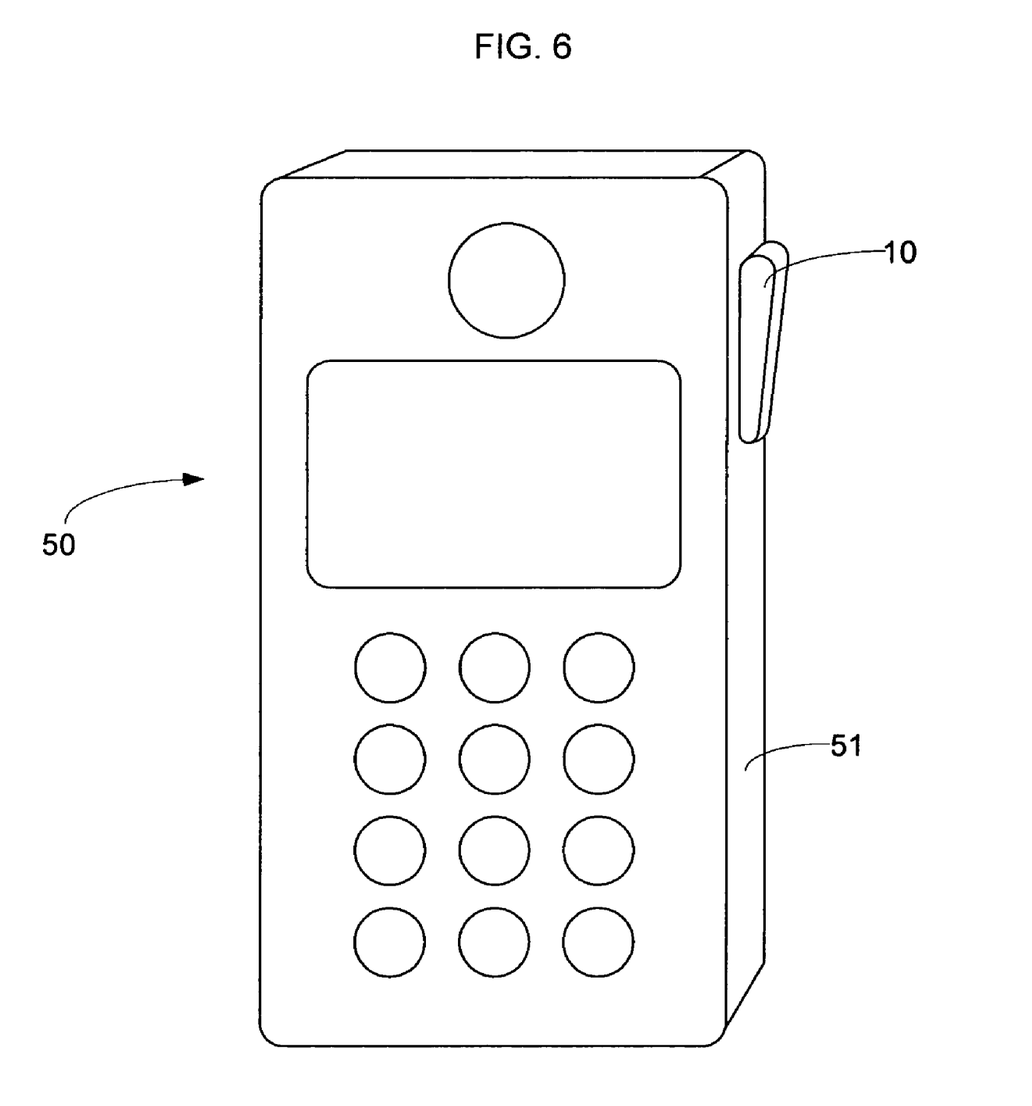
FIG. 6 is a perspective view of a cellular telephone with the electromagnetic radiation dissipation device adhered to the outside shell.

FIG. 6 illustrates device 10 incorporating target antenna 14 as it is applied to a cellular telephone 50. Cellular telephone 50 is the electromagnetic emission source 11. Dissipation device 10 does not have to be connected in any way to the emission source 11. For example, in the preferred embodiment, the dissipation device 10 is not connected electrically to the cellular telephone 50. Additionally, dissipation device 10 can simply rest near cellular telephone 50 by being worn on a persons clothing or integrated into accessories, such as jewelry, lanyards, hats or scarves. Preferably, however, dissipation device 10 is connected physically to the emission source 11, simply so that dissipation device 10 does not inadvertently get separated from the emission source 11 and stop functioning as intended. For example, dissipation device 10 may be adhesively attached to the outer housing 51 of the cellular telephone 50, as shown in FIG. 6. Dissipation device 10 may be attached to the emission source 11 using other mechanisms, such as a screw, pin, compression or friction fit, for example, or dissipation device 10 may be integrally formed with the emission source 11. Regardless of whether dissipation device 10 is physically attached to emission source 11, it must be within a certain distance to capture the undesirable radiation. This distance depends on a number of factors, including the emission frequency, power, medium through which the radiation is traveling, etc. The acceptable distance 20 is symbolically indicated in FIG. 2 with the dotted line. Preferably, the dissipation device 10 is positioned within 6 inches of a cellular telephone or other emission source.

In addition to use with cellular telephones, the present invention may be used with other emission sources such as other wireless communication devices such as satellite phones, BlackBerry® and other email-transmitting devices; wide area wireless local area networks; microwave ovens; portable radios, music players, and video players; automatic garage door and building door openers; police radar guns; short-wave and other ham radios; televisions or other cathode ray tube and plasma displays; power transmission lines; radioactive chemicals; or any other emission source. The present invention may also be used to indicate when electromagnetic radiation is present yet the emission source is unknown.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

We claim:

1. A method of reducing exposure to undesired electromagnetic radiation emanating from an active emission source, the method comprising:
   a. receiving electromagnetic radiation from the active emission source at a target antenna whereby current is induced in the target antenna;
   b. conducting the current to a dissipation assembly, the dissipation assembly comprising a pulse generator; and
   c. operating the dissipation assembly with the current;
   wherein the target antenna comprises a microstrip disposed on a printed circuit board;
   wherein the microstrip comprises multiple meandering segments serially connected; and
   wherein one or more meandering segments has ninety-degree bends and one or more meandering segments has bends not equal to ninety degrees.

2. A method of reducing exposure to undesired electromagnetic radiation emanating from an active emission source, the method comprising:
   a. physically connecting a target antenna to the active emission source;
   b. receiving electromagnetic radiation from the active emission source at the target antenna whereby current is induced in the target antenna;
   c. conducting the current to a dissipation assembly; and
   d. operating the dissipation assembly with the current;
   wherein the target antenna comprises a microstrip disposed on a printed circuit board;
   wherein the microstrip comprises multiple meandering segments serially connected; and
   wherein one or more meandering segments has ninety-degree bends and one or more meandering segments has bends not equal to ninety degrees.

3. A device for reducing harmful electromagnetic radiation emanating from an active emission source, the device comprising:
   a. a target antenna for receiving electromagnetic radiation emitted from the active emission source comprising a microstrip disposed on a printed circuit board, wherein the microstrip comprises multiple meandering segments serially connected and wherein one or more meandering segments has ninety-degree bends and one or more meandering segments has bends not equal to ninety degrees; and
   b. a dissipation assembly connected to the target antenna; the dissipation assembly comprising a pulse generator.

4. A device for reducing harmful electromagnetic radiation emanating from an active emission source, the device comprising:
   a. a target antenna for receiving electromagnetic radiation emitted from the active emission source, the target antenna comprising a microstrip disposed on a printed circuit board, wherein the microstrip comprises multiple serially-connected meandering segments arranged in a bottle shape, and wherein one or more meandering segments has ninety-degree bends and one or more meandering segments has bends not equal to ninety degrees; and
   b. a dissipation assembly connected to the target antenna.

5. A device for reducing harmful electromagnetic radiation emanating from an active emission source, the device comprising:
   a. a target antenna for receiving electromagnetic radiation emitted from the active emission source, the target antenna comprising a microstrip disposed on a printed circuit board, the microstrip comprising:
      1. a first meandering segment having 90-degree bends;
      2. a second meandering segment serially connected to the first meandering segment and having bends not equal to 90 degrees;
      3. a third meandering segment serially connected to the second meandering segment and having 90-degree bends; and
      4. a fourth meandering segment serially connected to the third meandering segment and having bends not equal to 90 degrees; and
   b. a dissipation assembly connected to the target antenna.

6. The device of claim 5 wherein the microstrip further comprises a fifth meandering segment serially connected to the fourth meandering segment and having bends equal to 90 degrees.

7. The device of claim 6 wherein the fourth meandering segment comprises at least one bend greater than 90 degrees and at least one bend less than 90 degrees.

8. A device for reducing harmful electromagnetic radiation emanating from an active emission source at 1900 MHz, the device comprising:
   a. a varying angle antenna comprising a microstrip disposed on a printed circuit board, wherein the microstrip comprises:
      i. a first meandering segment having a first vertical portion 0.07 inches in height, a first horizontal portion 0.18 inches in width connected at a 90° angle to the first vertical section, a second vertical portion 0.07 inches in height connected at a 90° angle to the first horizontal portion; a second horizontal portion 0.32 inches in width connected at a 90° angle to the second vertical portion; a third vertical portion 0.07 inches in height connected at a 90° angle to the second horizontal portion; and a third horizontal portion 0.32 inches in width oriented at a 90° angle from and connected to the third vertical portion;
      ii. a second meandering segment serially connected to the first microstrip segment and having a first vertical portion with a vertical displacement of 0.07 inches connected at a 65.83° angle to the third horizontal portion of the first meandering segment; a first horizontal portion connected at a 114.17° to the first vertical portion; a second vertical portion with a vertical displacement of 0.07 inches connected at a 65.83° angle; and a second horizontal portion connected at a 114.17° angle to the second vertical portion;
      iii. a third meandering segment serially connected to the second meandering segment and having a first vertical portion 0.07 inches in height and connected at a 90° angle to the second horizontal portion of the second meandering segment; a first horizontal portion 0.20 inches in width connected at a 90° angle to the first vertical section, a second vertical portion 0.07 inches in height connected at a 90° angle to the first horizontal portion; a second horizontal portion 0.20 inches in width connected at a 90° angle to the second vertical portion; a third vertical portion 0.07 inches in height connected at a 90° angle to the second horizontal portion; and a third horizontal portion 0.20 inches in width connected at a 90° angle from the third vertical portion; a fourth vertical portion 0.07 inches in height connected at a 90° angle to the third horizontal portion; and a fourth horizontal portion 0.20 inches in width connected at a 90° angle from the fourth vertical portion;

iv. a fourth meandering segment serially connected to the third meandering segment and having a first vertical portion with a vertical displacement of 0.07 inches connected at a 146.71° angle to the fourth horizontal portion of the third meandering segment; a first horizontal portion 0.32 inches in width connected at a 33.29° to the first vertical portion; and v. a fifth meandering segment serially connected to the fourth meandering segment and having a first vertical portion 0.07 inches in height and connected at a 90° angle to the first horizontal portion of the fourth meandering segment; a first horizontal portion 0.32 inches in width connected at a 90° angle to the first vertical section, a second vertical portion 0.07 inches in height connected at a 90° angle to the first horizontal portion; a second horizontal portion 0.32 inches in width connected at a 90° angle to the second vertical portion; a third vertical portion 0.07 inches in height connected at a 90° angle to the second horizontal portion; and a third horizontal portion 0.32 inches in width connected at a 90° angle from the third vertical portion; a fourth vertical portion 0.07 inches in height connected at a 90° angle to the third horizontal portion; and a fourth horizontal portion 0.16 inches in width connected at a 90° angle from the fourth vertical portion; and b. a dissipation assembly connected to the varying angle antenna.

* * * * *